United States Patent
Um et al.

(10) Patent No.: US 12,153,315 B2
(45) Date of Patent: Nov. 26, 2024

(54) DISPLAY PANEL AND ARRAY SUBSTRATE THEREOF

(71) Applicant: TCL China Star Optoelectronics Technology Co., Ltd., Guangdong (CN)

(72) Inventors: Yoonsung Um, Guangdong (CN); Kaili Qu, Guangdong (CN); Qi Zhang, Guangdong (CN); Yihe Zhang, Guangdong (CN); Jing Liu, Guangdong (CN); Kunhuang Peng, Guangdong (CN); Chuwei Liang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,392

(22) PCT Filed: Aug. 26, 2021

(86) PCT No.: PCT/CN2021/114759
§ 371 (c)(1),
(2) Date: Sep. 30, 2021

(87) PCT Pub. No.: WO2023/019625
PCT Pub. Date: Feb. 23, 2023

(65) Prior Publication Data
US 2024/0045287 A1    Feb. 8, 2024

(30) Foreign Application Priority Data
Aug. 18, 2021 (CN) .......................... 202110948020.1

(51) Int. Cl.
*G02F 1/1362*    (2006.01)

(52) U.S. Cl.
CPC .. *G02F 1/136286* (2013.01); *G02F 1/136259* (2013.01)

(58) Field of Classification Search
CPC ........ G02F 1/136286; G02F 1/136259; G09G 3/3614; G09G 2300/0823; G09G 3/3611
See application file for complete search history.

(56) References Cited

U.S. PATENT DOCUMENTS

2010/0265238 A1    10/2010    Lee et al.
2010/0302215 A1    12/2010    Tsai et al.
(Continued)

FOREIGN PATENT DOCUMENTS

CN    104880874    9/2015
CN    105353545    2/2016
(Continued)

OTHER PUBLICATIONS

International Search Report and the Written Opinion Dated Jun. 18, 2022 From the International Searching Authority Re. Application No. PCT/CN2021/114759 and Its Translation Into English. (14 Pages).
(Continued)

*Primary Examiner* — Mariam Qureshi

(57) ABSTRACT

A display panel and an array substrate thereof, which include a plurality of sub-pixel groups arranged in a matrix on the array substrate. Each sub-pixel group includes a plurality of sub-pixels arranged along rows and columns. Two adjacent sub-pixels in the same row have different colors, and two adjacent sub-pixels in the same column have the same color. In two adjacent rows of sub-pixels, an odd-numbered column or an even-numbered column is set as a target column. Two sub-pixels of the target column in the sub-pixel group are electrically connected to two adjacent data lines located on both sides of the target column. Two sub-pixels in an adjacent column of the target column are electrically con-
(Continued)

nected to two adjacent data lines located on both sides of the target column. Thus, a risk of crosstalk is effectively reduced.

20 Claims, 10 Drawing Sheets

(56) References Cited

U.S. PATENT DOCUMENTS

| | | | |
|---|---|---|---|
| 2011/0007257 | A1 | 1/2011 | Min et al. |
| 2014/0111410 | A1 | 4/2014 | Guo |
| 2016/0351136 | A1* | 12/2016 | He .................... G09G 3/003 |
| 2016/0372076 | A1* | 12/2016 | Koh .................. G09G 3/3648 |
| 2017/0186353 | A1* | 6/2017 | Hwang .............. G09G 3/3648 |
| 2020/0118511 | A1 | 4/2020 | Chen |
| 2020/0355970 | A1 | 11/2020 | Cheng et al. |
| 2021/0408060 | A1* | 12/2021 | Ji ...................... G09G 3/3648 |

FOREIGN PATENT DOCUMENTS

| | | |
|---|---|---|
| CN | 105974702 | 9/2016 |
| CN | 106067293 | 11/2016 |
| CN | 110379390 | 10/2019 |
| CN | 111312192 | 6/2020 |
| CN | 112230484 | 1/2021 |
| CN | 112394578 | 2/2021 |
| JP | 2010-250323 | 11/2010 |
| JP | 2014-026069 | 2/2014 |
| KR | 10-0783701 | 12/2007 |
| KR | 10-2017-0077940 | 7/2017 |

OTHER PUBLICATIONS

Notification of Office Action and Search Report Dated Mar. 30, 2022 From the State Intellectual Property Office of the People's Republic of China Re. Application No. 202110948020.1 and Its Translation Into English.(17 Pages).
Notification of Office Action Dated Sep. 29, 2022 From the State Intellectual Property Office of the People's Republic of China Re. Application No. 202110948020.1 and Its Translation Into English. (13 Pages).
Opinion Submission Notice Dated Mar. 29, 2023 From the Korean Intellectual Property Office Re. Application No. 10-2021-7035569 and Its Translation Into English. (18 Pages).
Request for the Submission of an Opinion Dated Sep. 26, 2022 From the Korean Intellectual Property Office Re. Application No. 10-2021-7035569 and Its Translation Into English. (19 Pages).
Notice of Reasons for Refusal Dated Jun. 25, 2024 From the Japan Patent Office Re. Application No. 2021-550200 and Its Translation Into English. (12 Pages).

* cited by examiner

DISPLAY PANEL AND ARRAY SUBSTRATE THEREOF

RELATED APPLICATIONS

This application is a National Phase of PCT Patent Application No. PCT/CN2021/114759 having International filing date of Aug. 26, 2021, which claims the benefit of priority of Chinese Patent Application No. 202110948020.1 filed on Aug. 18, 2021. The contents of the above applications are all incorporated by reference as if fully set forth herein in their entirety.

FIELD AND BACKGROUND OF THE INVENTION

The present application relates to the field of display technologies, and more particularly to a display panel and an array substrate thereof.

In liquid crystal display panels, if a shared data line architecture is used instead, for example, a single data line is connected to two adjacent columns of sub-pixels on both sides. Only one side of any sub-pixel is connected to the data line, and the other side is not connected to the data line. The sub-pixels and the data lines on both sides form a coupling capacitance effect, which is likely to cause vertical crosstalk.

Color crosstalk can be regarded as a special kind of vertical crosstalk. If a wiring structure of the array substrate is not good, a risk of color crosstalk is higher.

Therefore, a solution is provided to solve the problems existing in the prior art.

SUMMARY OF THE INVENTION

The present invention provides a display panel and an array substrate thereof, which are used to solve the problem of high risk of color crosstalk in displaying color images in the prior art.

To solve the above problems, a first aspect of the present invention provides an array substrate comprising a plurality of scan lines; a plurality of data lines arranged cross with the plurality of scan lines, wherein two adjacent data lines are configured to have different voltage polarities; and a plurality of sub-pixel groups arranged in a matrix on the array substrate, wherein each sub-pixel group comprises a plurality of sub-pixels arranged along rows and columns, two adjacent sub-pixels in the same row are configured to have different colors, and two adjacent sub-pixels in the same column are configured to have the same color; in two rows of sub-pixels, an odd-numbered column or an even-numbered column is set as a target column, two sub-pixels of the target column in the sub-pixel group are electrically connected to two adjacent data lines located on both sides of the target column, and two sub-pixels in a column adjacent to the target column are electrically connected to two adjacent data lines located on both sides of the target column; wherein two adjacent sub-pixels along a row and a column are configured to have different voltage polarities; and in the sub-pixels in the same column of the sub-pixel group, two adjacent sub-pixels are electrically connected to two adjacent data lines on both sides of the target column from an end far away from the scan line or an end close to the scan line.

According to an embodiment of the present invention, in two adjacent sub-pixels in a column adjacent to the target column, one sub-pixel extends to form a conductive line that crosses one of two adjacent data lines on both sides of the target column and is electrically connected to the other data line, and the other sub-pixel is electrically connected to one data line that is crossed over.

According to an embodiment of the present invention, in two adjacent sub-pixels in a column adjacent to the target column, one sub-pixel extends from one end close to the scan line to form a right-angle turning wire, spans one of two adjacent data lines on both sides of the target column and is electrically connected to the other data line.

According to an embodiment of the present invention, two adjacent sub-pixels in the same column of the sub-pixel group extend from an end close to the scan line to form a right-angle turning wire to be electrically connected to the data line.

According to an embodiment of the present invention, two adjacent sub-pixels in the same column of the sub-pixel group extend from an end far away from the scan line to form a right-angle turning wire or an obtuse-angle turning wire to be electrically connected to the data line.

According to an embodiment of the present invention, in the sub-pixels in the same row of the sub-pixel group, two adjacent sub-pixels are respectively electrically connected to two adjacent data lines on both sides of the target column from an end far away from the scan line and an end close to the scan line.

According to an embodiment of the present invention, in two adjacent sub-pixels in the same row of the sub-pixel group, one sub-pixel extends to form a conductive line that crosses one of two adjacent data lines on both sides of the target column and is electrically connected to the other data line, and the other sub-pixel is electrically connected to one data line that is crossed over.

According to an embodiment of the present invention, in two adjacent sub-pixels in the same row of the sub-pixel group, one sub-pixel extends from one end close to the scan line to form a right-angle turning wire, spans one of two adjacent data lines on both sides of the target column and is electrically connected to the other data line.

In order to solve the above problems, a second aspect of the present invention provides an array substrate comprising a plurality of scan lines; a plurality of data lines arranged cross with the plurality of scan lines, wherein two adjacent data lines are configured to have different voltage polarities; and a plurality of sub-pixel groups arranged in a matrix on the array substrate, wherein each sub-pixel group comprises a plurality of sub-pixels arranged along rows and columns, two adjacent sub-pixels in the same row are configured to have different colors, and two adjacent sub-pixels in the same column are configured to have the same color; in two rows of sub-pixels, an odd-numbered column or an even-numbered column is set as a target column, two sub-pixels of the target column in the sub-pixel group are electrically connected to two adjacent data lines located on both sides of the target column, and two sub-pixels in a column adjacent to the target column are electrically connected to two adjacent data lines located on both sides of the target column.

According to an embodiment of the present invention, in the sub-pixels in the same column of the sub-pixel group, two adjacent sub-pixels are electrically connected to two adjacent data lines on both sides of the target column from an end far away from the scan line or an end close to the scan line.

According to an embodiment of the present invention, the two adjacent sub-pixels in a column adjacent to the target column, one sub-pixel extends to form a conductive line that crosses one of two adjacent data lines on both sides of the target column and is electrically connected to the other data line, and the other sub-pixel is electrically connected to one data line that is crossed over.

According to an embodiment of the present invention, in two adjacent sub-pixels in a column adjacent to the target column, one sub-pixel extends from one end close to the scan line to form a right-angle turning wire, spans one of two adjacent data lines on both sides of the target column and is electrically connected to the other data line.

According to an embodiment of the present invention, two adjacent sub-pixels in the same column of the sub-pixel group extend from an end close to the scan line to form a right-angle turning wire to be electrically connected to the data line.

According to an embodiment of the present invention, two adjacent sub-pixels in the same column of the sub-pixel group extend from an end far away from the scan line to form a right-angle turning wire or an obtuse-angle turning wire to be electrically connected to the data line.

According to an embodiment of the present invention, in the sub-pixels in the same row of the sub-pixel group, two adjacent sub-pixels are respectively electrically connected to two adjacent data lines on both sides of the target column from an end far away from the scan line and an end close to the scan line.

According to an embodiment of the present invention, in two adjacent sub-pixels in the same row of the sub-pixel group, one sub-pixel extends to form a conductive line that crosses one of two adjacent data lines on both sides of the target column and is electrically connected to the other data line, and the other sub-pixel is electrically connected to one data line that is crossed over.

According to an embodiment of the present invention, in two adjacent sub-pixels in the same row of the sub-pixel group, one sub-pixel extends from one end close to the scan line to form a right-angle turning wire, spans one of two adjacent data lines on both sides of the target column and is electrically connected to the other data line.

In order to solve the above-mentioned problems, a third aspect of the present invention provides a display panel including the above-mentioned array substrate.

Beneficial effect: A display panel and an array substrate thereof, which include a plurality of sub-pixel groups arranged in a matrix on the array substrate. Each sub-pixel group includes a plurality of sub-pixels arranged along rows and columns. Two adjacent sub-pixels in the same row have different colors, and two adjacent sub-pixels in the same column have the same color. In two adjacent rows of sub-pixels, an odd-numbered column or an even-numbered column is set as a target column. Two sub-pixels of the target column in the sub-pixel group are electrically connected to two adjacent data lines located on both sides of the target column. Two sub-pixels in an adjacent column of the target column are electrically connected to two adjacent data lines located on both sides of the target column. For example, by configuring two adjacent data lines to have different voltage polarities, two sub-pixels in an even-numbered column are electrically connected to two adjacent data lines on both sides of the odd-numbered column. This can balance a coupling capacitance effect from both sides of the sub-pixels in the odd-numbered column, and improve a crosstalk caused by an imbalance of a coupling voltage. Therefore, compared with other substrate layout techniques, the display panel and the array substrate of the present invention can achieve beneficial effects such as effectively reducing a risk of crosstalk in a display image, which is beneficial to optimize a use experience and improve a technical level.

BRIEF DESCRIPTION OF THE SEVERAL VIEWS OF THE DRAWINGS

In order to explain the technical solution in the present application more clearly, the following will briefly introduce the drawings that need to be used in the description of the embodiments. Obviously, the drawings in the following description are only some embodiments of the present application. For those skilled in the art, other drawings can be obtained based on these drawings without creative work.

DESCRIPTION OF SPECIFIC EMBODIMENTS OF THE INVENTION

Figure 1:
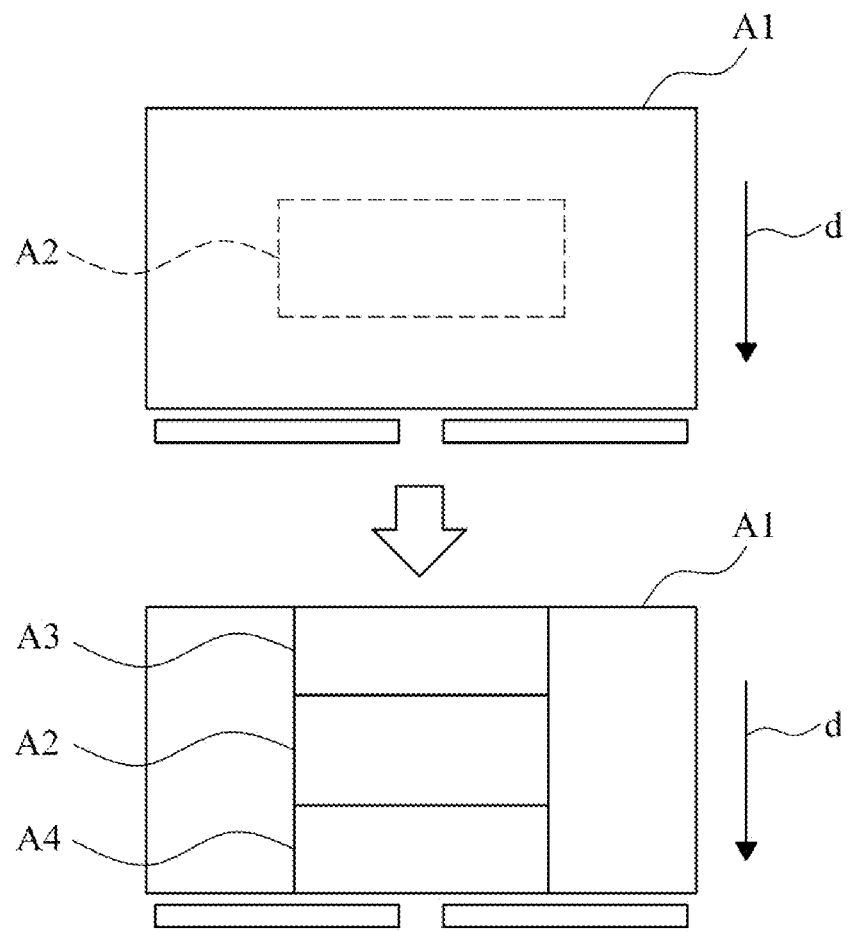
FIG. 1 is a schematic diagram of a display image where vertical crosstalk occurs.

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

In the description herein, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or the positional relationships are based on a position or positional relationship shown in the drawings. This is only to facilitate the description of the present invention and simplify the description. It does not indicate or imply that the device or element referred to has a specific orientation, is constructed and operated in a specific orientation, and therefore cannot be understood as a limitation of the present invention.

In the description herein, it should be understood that the terms "first" and "second" are only used for descriptive purposes. It cannot be understood as indicating or implying relative importance or implicitly indicating the number of indicated technical features. Therefore, the features defined with "first" and "second" may explicitly or implicitly include one or more of the features. In the description of the present invention, "plurality" means two or more, unless otherwise specifically defined.

Many different embodiments or examples are provided herein to realize the different structures of the present invention. In order to simplify the disclosure of the present invention, the components and settings of specific examples are described below. Of course, they are only examples, and the purpose is not to limit the present invention. In addition, the present invention may repeat reference numerals and/or reference letters in different examples. This repetition is for the purpose of simplification and clarity and does not in itself indicate the relationship between the various embodiments and/or settings discussed. In addition, examples of various specific processes and materials are provided herein, but those of ordinary skill in the art may be aware of the application of other processes and/or the use of other materials.

In a liquid crystal display panel, if crosstalk occurs, it will lead to a poor user experience.

For example, as shown in FIG. 1, if a display area A1 displays a grayscale image along a vertical scanning direction d. For example, a gray level of a middle frame A2 is L255 (white), gray levels of an upper frame A3 and a lower frame A4 are L127, and a gray level of a surrounding area is L64, vertical crosstalk may occur. On the other hand, if the display area A1 displays a color image along the scanning direction d. For example, if the middle frame A2 is a color frame (pure color or mixed color), gray levels of the upper frame A3 and the lower frame A4 are L127, and a gray level of the surrounding area is L64, color crosstalk may occur.

Figure 2A:
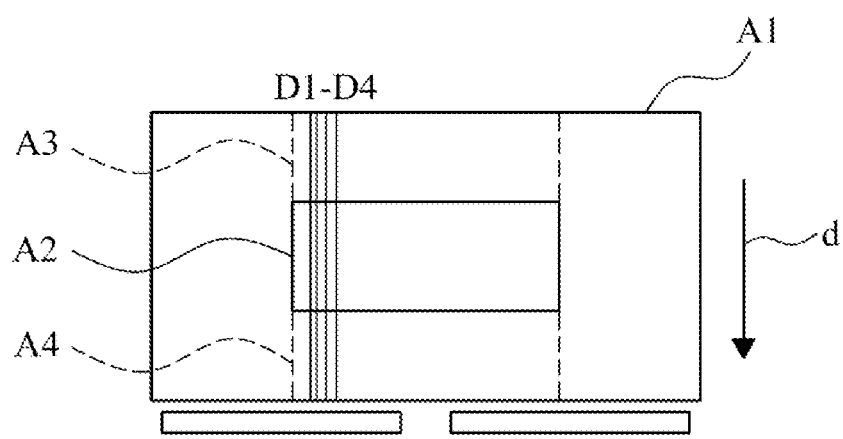
FIG. 2A is a schematic diagram of a display image where color crosstalk occurs.
Figure 2B:
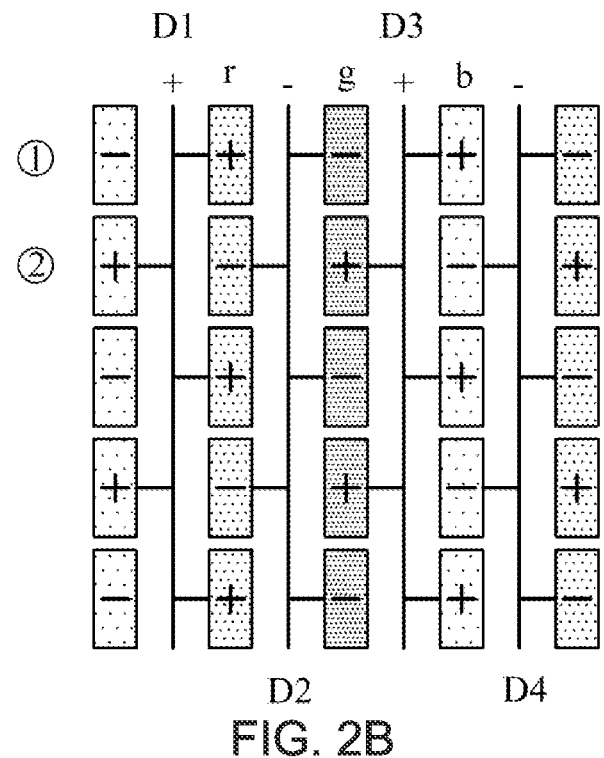
FIG. 2B is a schematic diagram of a connection between sub-pixels and data lines used in a dot inversion mode.
Figure 2C:
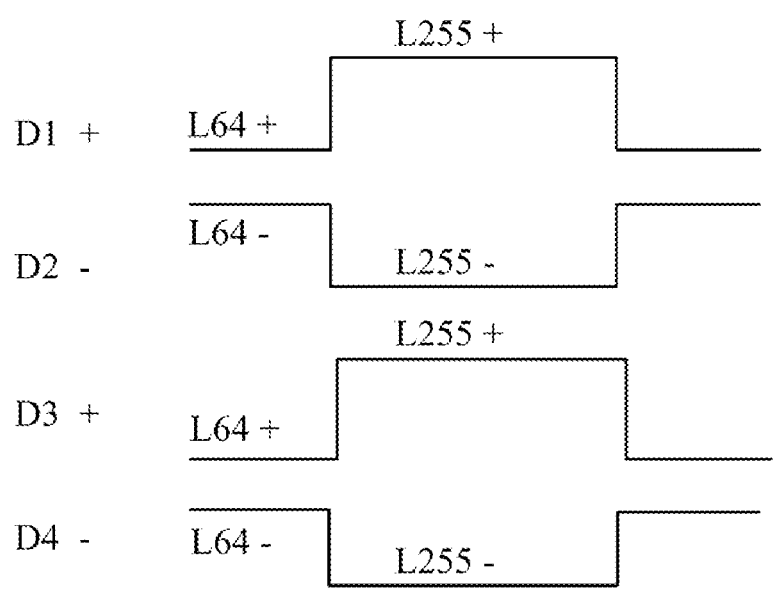
FIG. 2C is a schematic diagram showing a waveform of a data line of a monochrome frame.
Figure 2D:
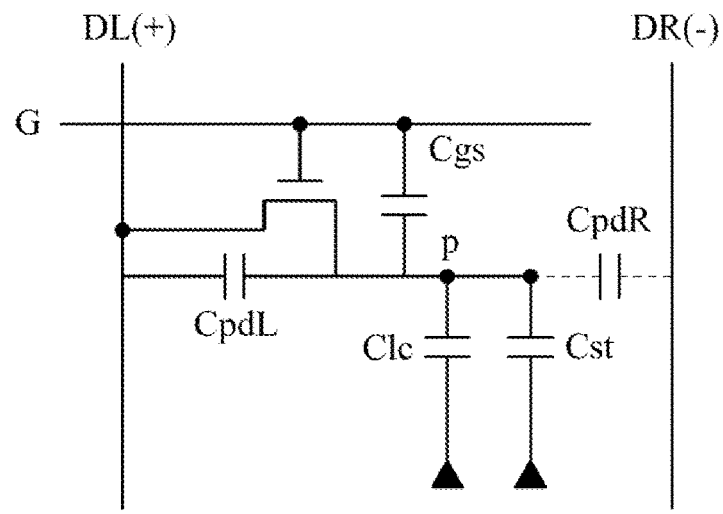
FIG. 2D is a schematic diagram of an equivalent circuit of a sub-pixel.
Figure 2E:
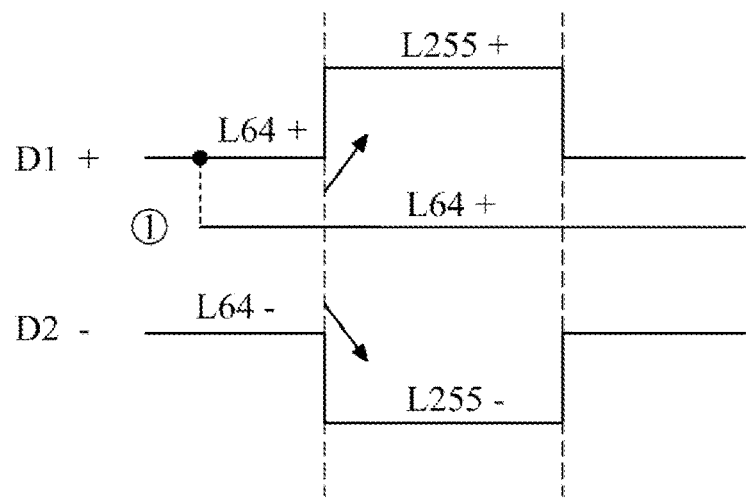
FIG. 2E and FIG. 2F are schematic diagrams of pixel voltages of sub-pixels in different rows of a monochrome frame affected by a data line coupling effect.
Figure 2F:
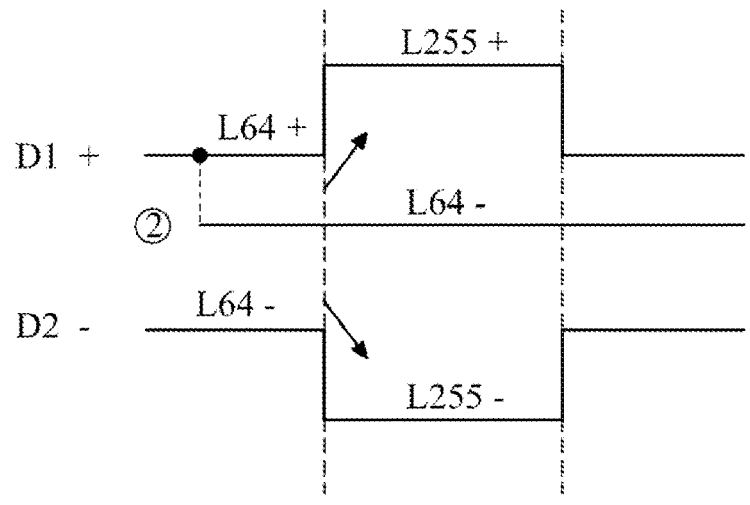

For example, as shown in FIG. 2A, if there are data lines D1-D4 along the vertical scanning direction d (for example, they are configured for red, green, blue, and red from left to right) passing through the middle frame A2 (for example, white, the gray level is L255, as an observation area). As shown in FIG. 2B, it is assumed that red (r), green (g), and blue (b) columns of sub-pixels are connected to the data lines D1-D4 to implement a dot inversion mode. Take the observation area as an example, as shown in FIG. 2C, it is assumed that waveforms of data lines D1(+) and D3(+) are between "L64+" and "L255+", and waveforms of data lines D2(−) and D4(−) are between "L64−" and "L255−". As shown in FIG. 2D, a single sub-pixel equivalent circuit between two vertical data lines DL(+) and DR(−) includes, for example, a scan line G(n) is connected to a point p through a transistor and a capacitor Cgs, and the point p is connected capacitors Clc and Cst to the ground, where there are coupling capacitors CpdL and CpdR between the point p and the data lines DL (+) and DR (−). When a crosstalk image is displayed, as shown in FIG. 2E and FIG. 2F, because voltage polarities of data lines on both sides of the sub-pixels are opposite, waveforms are symmetrical. Taking red (r) sub-pixels in rows 1 and 2 as an example, the data line DL(+) is coupled to the D1(+) waveform through the capacitor CpdL. A pixel voltage at the point p in FIG. 2D is pulled up, and the data line DR(−) is coupled to the D2(−) waveform through the capacitor CpdR. The pixel voltage at the point p in FIG. 2D is pulled down, and the red sub-pixel is offset by a coupling effect of the data lines on both sides.

Figure 2G:
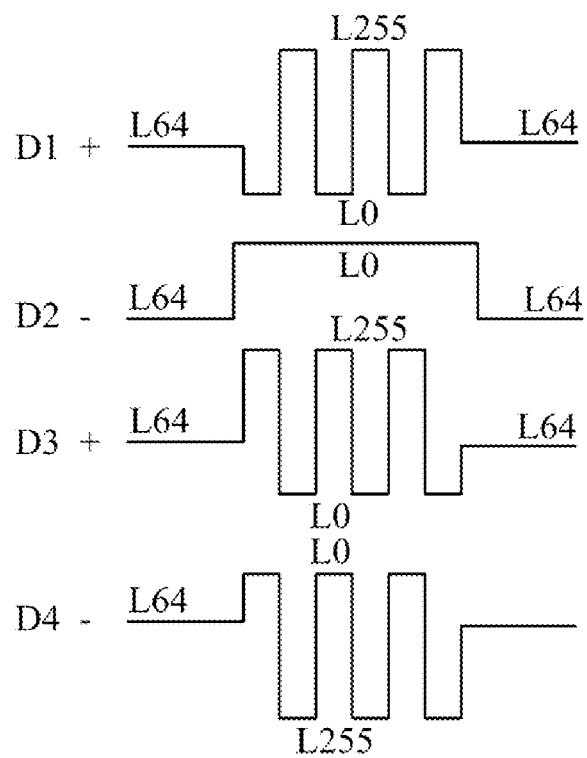
FIG. 2G is a schematic diagram showing a data line waveform of a color frame.
Figure 2H:
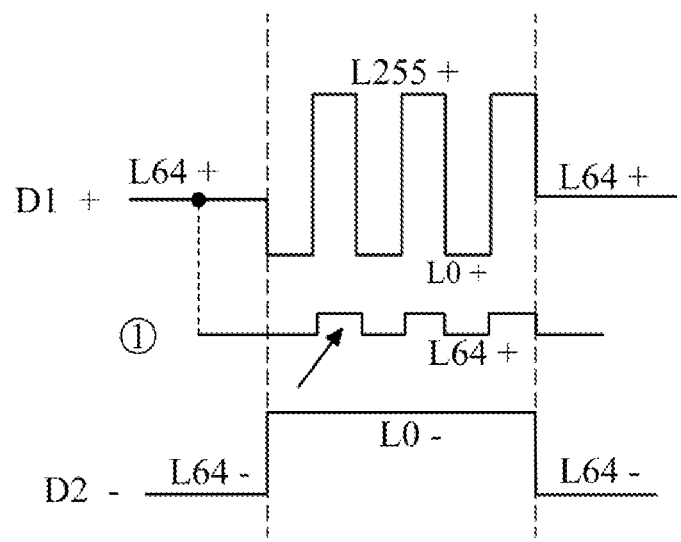
FIG. 2H and FIG. 2I are schematic diagrams of pixel voltages of sub-pixels in different rows of a color frame affected by a data line coupling effect.
Figure 2I:
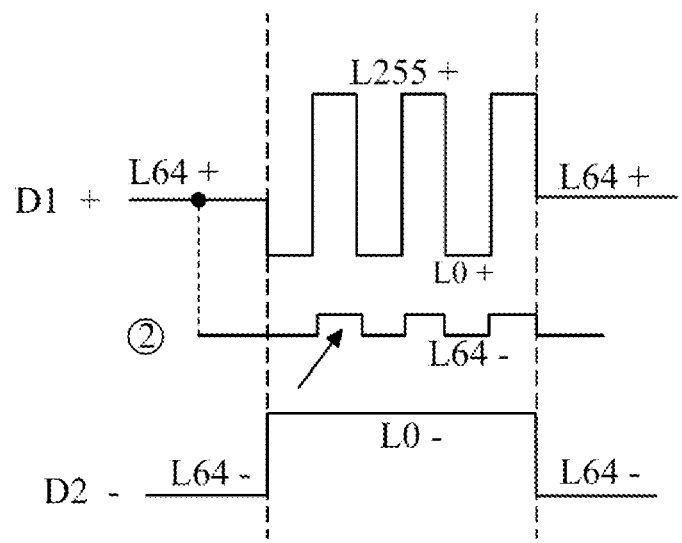

On the other hand, as shown in FIG. 2A, it is assumed that there are data lines D1-D4 along the vertical scanning direction d (for example, arranged for red, green, blue, and red from left to right) passing through the middle frame A2 (for example, blue, as an observation area), upper frame A3 (e.g., dark blue) and lower frame (e.g., dark green). It is assumed that a connection structure of red (r), green (g), and blue (b) columns of sub-pixels and the data lines D1-D4 used to realize the dot inversion mode remains unchanged (as shown in FIG. 2B). Take the observation area as an example. FIG. 2G shows that it is assumed that waveforms of the data lines D1(+) and D3(+) are between "L64", "L0" and "L255", waveforms of the data line D2(−) are between "L64" and the "L0", and waveforms of D4(−) are between "L64" and "L255". When a crosstalk image is displayed, as shown in FIG. 2H and FIG. 2I, because a voltage polarity of data lines on both sides of the sub-pixel is opposite, the waveforms are asymmetric. Taking red (r) sub-pixels in rows ① and ② as an example, the data line DL (+) is coupled to the waveform of D1 (+) through the capacitor CpdL, and the pixel voltage of the red sub-pixels in row ① is pulled up (non-maintained L64+). The data line DR(−) is coupled to the waveform of D2(−) through the capacitor CpdR, and the pixel voltage of the red sub-pixel in the row is pulled up (non-maintained L64−). The red sub-pixels in the ① and ② rows are superimposed by the coupling effect of the data lines on both sides, causing the red sub-pixels in the ① row to become brighter. The red sub-pixels of line ② become darker, and an offset effect of bright and dark pixels of the upper and lower lines is not obvious, which leads to an increased risk of crosstalk.

It should be understood that color crosstalk can be regarded as a special type of vertical crosstalk, and a risk of color crosstalk is related to a wiring structure of an array substrate.

An embodiment of the present invention provides a display panel and an array substrate thereof, which can be used to improve crosstalk. Examples are as follows, but not limited to this.

In one aspect, an embodiment of the present invention provides an array substrate, which can be adapted to be provided in a display panel described herein, such as a liquid crystal display panel or a derivative thereof.

Figure 3:
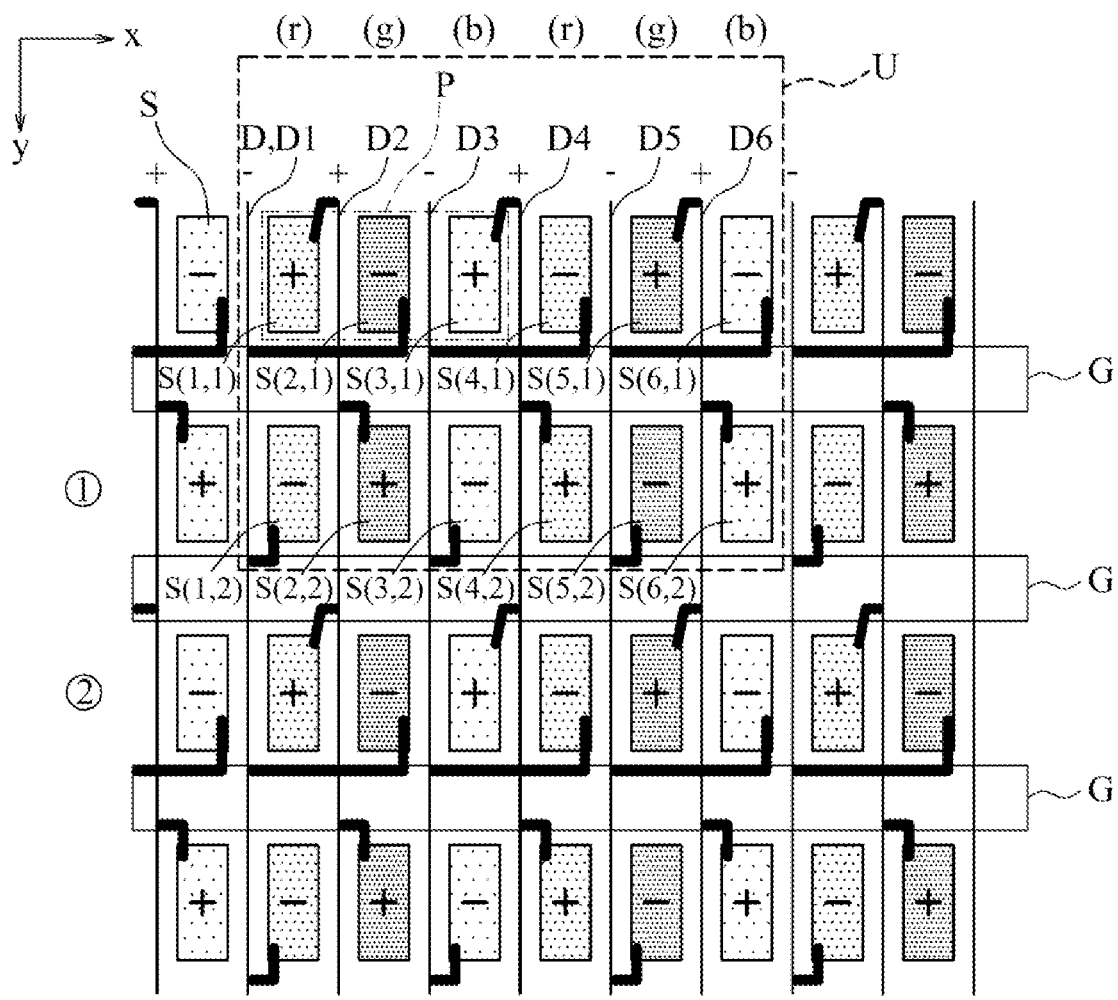
FIG. 3 is a schematic diagram of a structure of an array substrate according to an embodiment of the present invention.

As shown in FIG. 3, the array substrate of an embodiment of the present invention includes a plurality of scan lines G, a plurality of data lines D, and a plurality of sub-pixel groups U. The following examples illustrate the embodiments of the array substrate but are not limited thereto.

In order to enable those skilled in the art to be able to understand a color, a position, a voltage polarity of each sub-pixel and a voltage polarity of each data line, in the following example, color symbols such as r, g, and b, position coordinate symbols such as x and y, and voltage polarity symbols such as + and − will be marked in parentheses. The marked symbols are used as auxiliary explanatory information and should not be regarded as a limitation of the present invention.

It should be understood that the voltage polarity symbol indicates a voltage polarity state in an operating cycle. The voltage polarity can be repeatedly and periodically changed according to actual application conditions.

For example, as shown in FIG. 3, the plurality of data lines D and the plurality of scan lines G are cross-arranged for setting the plurality of sub-pixel groups U. Two adjacent data lines D are configured to have different voltage polarities, for example, the voltage polarity is positive (+) or negative (−). The plurality of sub-pixel groups U are arranged in a matrix on the array substrate, for example, are arranged repeatedly along rows and columns. Each sub-pixel group U includes a plurality of sub-pixels S arranged along rows and columns. Two adjacent sub-pixels S in the same row (in the horizontal direction in the figure) are arranged to have different colors, such as red (r), green (g) or blue (b), but not limited to this. Two adjacent sub-pixels S in the same column (the longitudinal direction in the figure) are arranged to have the same color.

Correspondingly, as shown in FIG. 3, in two adjacent rows of sub-pixels S, an odd-numbered column or an even-numbered column is set as a target column. For example, two sub-pixels S in the target column and two sub-pixels S in an adjacent column of the target column are electrically connected to two adjacent data lines D on both sides of the target column. For example, two sub-pixels S in the target column and two sub-pixels S in a column adjacent to the target column are electrically connected to two adjacent data lines D on both sides of the target column. For example, an electrical connection between the data line D and the two sub-pixels S of the target column and the two sub-pixels S of a column adjacent to the target column may be in a dot inversion mode (as shown in FIG. 3). For example, in the sub-pixel group U, two adjacent sub-pixels S are configured to have different voltage polarities. For example, two adjacent sub-pixels S in the same row are configured to have different voltage polarities, and two adjacent sub-pixels S in the same column are configured to have different voltage polarities. Alternatively, two adjacent sub-pixels S on one side of the scan line G are configured to have different voltage polarities, and two adjacent sub-pixels S on one side of the data line D are configured to have different voltage polarities. But not limited to this, for example, the data line D and the two sub-pixels S of the target column and the electrical connection of the two sub-pixels S adjacent to the target column may also be applied in a non-dot inversion mode. For example, in the sub-pixel group U, two adjacent sub-pixels S in the same column are configured to have different voltage polarities, and two adjacent sub-pixels S in the same row are configured to have the same voltage polarity.

It should be noted that, as shown in FIG. 3, in the sub-pixel group U, regardless of the two adjacent sub-pixels S in the same row are configured to have the same or different voltage polarities, the two sub-pixels S in the adjacent column of the target column are configured with different voltage polarities, that is, they are positive (+), negative (−) or negative (−), positive (+). The two sub-pixels S of the column introduce voltages of different polarities on both sides of the target column through the capacitive coupling effect. Therefore, the coupling capacitance effect from both sides of the sub-pixels in the target column can be balanced, and the crosstalk caused by the imbalance of the coupling voltage can be improved.

For example, as shown in FIG. 3, each sub-pixel group U includes a plurality of sub-pixels S arranged along two rows and six columns between the scan line G and the data line D. In this example, the column number x increases from left to right, and the row number y increases from top to bottom.

In this embodiment, only two adjacent sub-pixels along a row and a column are configured with different voltage polarities as an example for description. As shown in FIG. 3, the target column is an odd column as an example. For example, i=1, 3, . . . , so that the two sub-pixels S in the i-th column and the two sub-pixels S in the i+1-th column are electrically connected to two adjacent data lines D (voltage polarities are different), but not limited to this. The target column may also be an even-numbered column as an example. For example, i=2, 4, . . . , so that the two sub-pixels S in the i-th column and the two sub-pixels S in the i−1th column are electrically connected to two adjacent data lines D (voltage polarities are different). Through proper configuration, two adjacent sub-pixels S are configured to have different voltage polarities.

In this embodiment, the sub-pixel group U is defined as taking the six sub-pixels S in the first and second rows in the upper part of FIG. 3 as an example, but it is not limited to this. If necessary, the six sub-pixels S in the second and third rows in the middle of FIG. 3 can also be defined as another sub-pixel group.

For example, as shown in FIG. 3, two adjacent sub-pixels S in the same row (in the horizontal direction in the figure) are configured to have different colors. Two adjacent sub-pixels S in the same column (the longitudinal direction in the figure) are arranged to have the same color. For example, in the first row of the sub-pixel group U, the first to sixth columns of sub-pixels S (1, 1), S (2, 1), S (3, 1), S (4, 1), S (5, 1) and S (6, 1) are sequentially arranged into red (r), green (g), blue (b), red (r), green (g), and blue (b) sub-pixels. In the second row of the sub-pixel group U, the first to sixth columns of sub-pixels S (1, 2), S (2, 2), S (3, 2), S (4, 2), S (5, 2), S (6, 2) are sequentially arranged into red (r), green (g), blue (b), red (r), green (g), and blue (b) sub-pixels. It should be understood that the red (r), green (g), and blue (b) sub-pixels S arranged horizontally can be regarded as one pixel P.

Exemplarily, as shown in FIG. 3, each sub-pixel S is electrically connected to one data line D of the plurality of data lines D. Two adjacent sub-pixels S are configured to have different voltage polarities. For example, in the first row of the sub-pixel group U, voltage polarities of the sub-pixels S (1, 1), S (2, 1), S (3, 1), S (4, 1), S (5, 1) and S (6, 1) in the first to sixth columns are respectively positive (+), negative (−), positive (+), negative (−), positive (+), and negative (−). In the second row of the sub-pixel group U, the voltage polarities of the sub-pixels S (1, 2), S (2, 2), S (3, 2), S (4, 2), S (5, 2) and S (6, 2) in the first to sixth columns are respectively negative (−), positive (+), negative (−), positive (+), and negative (−), positive (+).

For example, as shown in FIG. 3, in two adjacent rows of sub-pixels S, for example, the target column is an odd column. The two sub-pixels S in the odd-numbered column are electrically connected to two adjacent data lines D on both sides of the odd-numbered column. The two sub-pixels S in the even-numbered column are electrically connected to two adjacent data lines D on both sides of the odd-numbered column. For example, in the first column (x=1) of the sub-pixel group U, the red (r) sub-pixel S (1, 1) in the first row (y=1) is electrically connected to the data line D2(+). The red (r) sub-pixel S (1, 2) in the second row (y=2) is electrically connected to the data line D1(−). In the second column (x=2) of the sub-pixel group U, the green (g) sub-pixel S (2, 1) in the first row (y=1) is electrically connected to the data line D1(−). The green (g) sub-pixel S (2, 2) in the second row (y=2) is electrically connected to the data line D2(+). For example, in the third column (x=3) of the sub-pixel group U, the blue (b) sub-pixel S (3, 1) in the first row (y=1) is electrically connected to the data line D4(+). The blue (b) sub-pixel S (3, 2) in the second row (y=2) is electrically connected to the data line D3(−). In the fourth column (x=4) of the sub-pixel group U, the red (r) sub-pixel S (4, 1) in the first row (y=1) is electrically connected to the data line D3(−). The red (r) sub-pixel S (4, 2) in the second row (y=2) is electrically connected to the data line D4(+). For example, in the fifth column (x=5) of the sub-pixel group U, the green (g) sub-pixel S (5, 1) in the first row (y=1) is electrically connected to the data line D6(+). The green (g) sub-pixel S (5, 2) in the second row (y=2) is electrically connected to the data line D5(−). In the sixth column (x=6) of the sub-pixel group U, the blue (b) sub-pixel S (6, 1) in the first row (y=1) is electrically connected to the data line D5(−). The blue (b) sub-pixel S (6, 2) in the second row (y=2) is electrically connected to the data line D6(+).

As mentioned above, many embodiments of the array substrate of the present invention are illustrated as follows, but not limited thereto.

Optionally, in an embodiment, as shown in FIG. 3, a single sub-pixel group U includes two rows of sub-pixels S, and each row of sub-pixels S is configured to form two pixels P. For example, each pixel P includes three-color sub-pixels S arranged in sequence, such as the three-color sub-pixels arranged sideways into red (r), green (g), and blue (b) color sub-pixels.

Optionally, in an embodiment, as shown in FIG. 3, in the sub-pixels S in the same column of the sub-pixel group U (for example, the target column or its adjacent column), two adjacent sub-pixels S are from an end far away from the scan line G or an end close to the scan line G is electrically connected to two adjacent data lines D on both sides of the target column. For example, in the first column of the sub-pixel group U, the red (r) sub-pixel S (1, 1) in the first row is electrically connected to the data line D2(+) from the end far away from the scan line G. The red (r) sub-pixel S (1, 2) in the second row is electrically connected to the data line D1(−) from the end far away from the scan line G. In the second column of the sub-pixel group U, the green (g) sub-pixel S (2, 1) in the first row is electrically connected to the data line D1(−) from the end close to the scan line G. The green (g) sub-pixel S (2, 2) in the second row is electrically connected to the data line D2(+) from the end close to the scan line G. The connection mode of the remaining sub-pixels S in the sub-pixel group U is deduced by analogy and will not be repeated.

Optionally, in an embodiment, as shown in FIG. 3, in two adjacent sub-pixels S in a column adjacent to the target column, one of the sub-pixels S extends to form a conductive line that crosses both sides of the target column. One of the two adjacent data lines D is electrically connected to the other data line. The other sub-pixel S is electrically connected to the one data line that is crossed over. For example, in a column (such as the second column of the sub-pixel group U) adjacent to the target column (such as the first column of the sub-pixel group U) adjacent two sub-pixels S (2, 1), S (2, 2), one of the sub-pixels S (2, 1) extends to form a conductive line that crosses one of the two adjacent data lines D1 and D2 on both sides of the target column, and is electrically connected to the other data line D1. For example, the sub-pixel S (2, 1) extends from one end close to the scan line G to form a right-angle turning wire and spans one of the two adjacent data lines D1 and D2 on both sides of the target column, and is electrically connected to the other data line D1. The other sub-pixel S (2, 2) is electrically connected to the one data line D2 that is crossed over.

Therefore, two sub-pixels in a column adjacent to the target column can be electrically connected to two adjacent data lines located on both sides of the target column. Two adjacent data lines are configured to have different voltage polarities. This can balance the coupling capacitance effect on both sides of the sub-pixels in the target column, and improve the crosstalk caused by the imbalance of the coupling voltage.

Optionally, in an embodiment, as shown in FIG. 3, the two adjacent sub-pixels S in the same column of the sub-pixel group U (for example, an adjacent column of the target column) extend from one end close to the scan line G to form a right-angle turning wire that is electrically connected to the data line D. For example, the two green (g) sub-pixels S (2, 1) and S (2, 2) in the second column of the sub-pixel group U respectively extend from one end close to the scan line G to form a right-angle turning wire s electrically connected to the data lines D1 (−) and D2 (+). Therefore, the two sub-pixels in a column adjacent to the target column can be electrically connected to two adjacent data lines located on both sides of the target column by making good use of space and proper wiring.

Optionally, in an embodiment, as shown in FIG. 3, two adjacent sub-pixels S in the same column of the sub-pixel group U (for example, the target column) extend from an end away from the scan line G to form a right-angle turning wire or an obtuse-angle turning wire that is electrically connected to the data line D. For example, in the first column of the sub-pixel group U, the red (r) sub-pixel S (1, 1) extends from an end far away from the scan line G to form an obtuse-angle turning wire that is electrically connected to the data line D2(+). The red (r) sub-pixel S (1, 2) extends from an end far away from the scan line G to form a right-angle turning wire to be electrically connected to the data line D1(−). Therefore, the two sub-pixels in a column adjacent to the target column can be electrically connected to two adjacent data lines located on both sides of the target column by making good use of space and proper wiring.

Optionally, in an embodiment, as shown in FIG. 3, in the sub-pixels S in the same row of the sub-pixel group U, two adjacent sub-pixels S are respectively electrically connected to two adjacent data lines D on both sides of the target column from an end far away from the scan line G and an end close to the scan line G. For example, in the first row of the sub-pixel group U, the red (r) sub-pixel S (1, 1) in the first column is electrically connected to the data line D2(+) from the end far away from the scan line G, and the green (g) sub-pixels S (2,1) in the second column are electrically connected to the data line D1(−) from the end close to the scan line G. In the second row of the sub-pixel group U, the red (r) sub-pixel S (1, 2) of the first column is electrically connected to the data line D1(−) from the end far away from the scan line G, the green (g) sub-pixel S (2, 2) in the second column is electrically connected to the data line D2(+) from the end close to the scan line G. The connection mode of the remaining sub-pixels S in the sub-pixel group U is deduced by analogy and will not be repeated.

Optionally, in an embodiment, as shown in FIG. 3, in two adjacent sub-pixels S in the same row of the sub-pixel group U, one of the sub-pixels S extends to form a conductive line that crosses one data line D of the two adjacent data lines D on both sides of the target column and is electrically connected to the other data line D. The other sub-pixel S is electrically connected to the one data line D that is crossed over. For example, in the red (r) sub-pixel S (1, 1) and green (g) sub-pixel S (2, 1) in the first row of the sub-pixel group U, the green (g) sub-pixel S (2,1) extends to form a conductive line that spans one of the two adjacent data lines D1(−) and D2(+) on both sides of the target column and connects to the other data line D2(+). One data line D1(−) is electrically connected, and the red (r) sub-pixel S (1, 1) is electrically connected to the crossed data line D2(+). In addition, in the blue (b) sub-pixel S (3, 1) and red (r) sub-pixel S (4, 1) in the first row of the sub-pixel group U, the red (r) sub-pixel S (4,1) extends to form a conductive line that spans one data line D4(+) of the two adjacent data lines D3(−) and D4(+) on both sides of the target column and is electrically connected to the other data line D3(−). The blue (b) sub-pixel S (3, 1) is electrically connected to the one data line D4(+) that is crossed over. In addition, in the green (g) sub-pixel S (5, 1) and blue (r) sub-pixel S (6, 1) in the first row of the sub-pixel group U, the blue (r) sub-pixel S (6, 1) extends to form a conductive line that spans one data line D6 (+) of the two adjacent data lines D5 (−) and D6 (+) on both sides of the target column and is electrically connected to the other data line D5 (−). The green (g) sub-pixel S (5, 1) is electrically connected to the one data line D6(+) that is crossed over.

Optionally, in an embodiment, as shown in FIG. 3, in two adjacent sub-pixels S in the same row of the sub-pixel group U, one of the sub-pixels extends from an end close to the scan line G to form a right-angle turning wire that spans one of the two adjacent data lines D on both sides of the target column and is electrically connected to the other data line D. For example, the green (g) sub-pixel S (2, 1) extends from one end close to the scan line G to form a right-angle turning wire that spans one data line D2(+) of the two adjacent data lines D1(−) and D2(+) on both sides of the target column and is electrically connected to the other data line D1(−). For example, the data line D2(+) and the right-angle turning wire are respectively located in two mutually insulated metal layers. The connection modes of the remaining sub-pixels, such as the red (r) sub-pixel S (4, 1) and the blue (b) sub-pixel S (6, 1), and so on, will not be repeated.

Therefore, two sub-pixels in a column adjacent to the target column can be electrically connected to two adjacent data lines located on both sides of the target column. Two adjacent data lines are configured to have different voltage polarities. This can balance the coupling capacitance effect from both sides of the sub-pixels in the target column, and improve the crosstalk caused by the imbalance of the coupling voltage.

Figure 4:
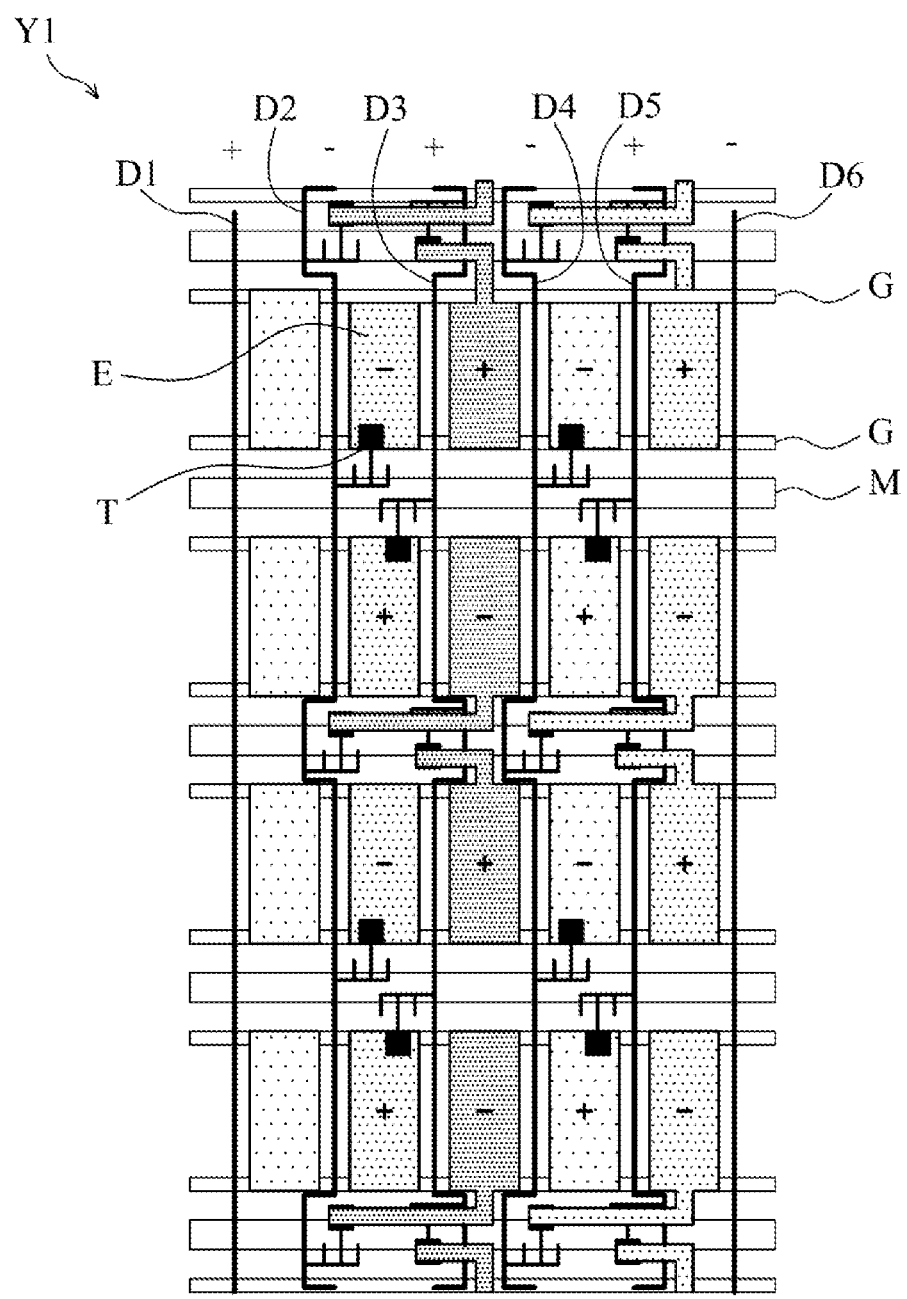
FIG. 4 and FIG. 5 are schematic diagrams of different wiring configurations of an array substrate according to an embodiment of the present invention.
Figure 5:
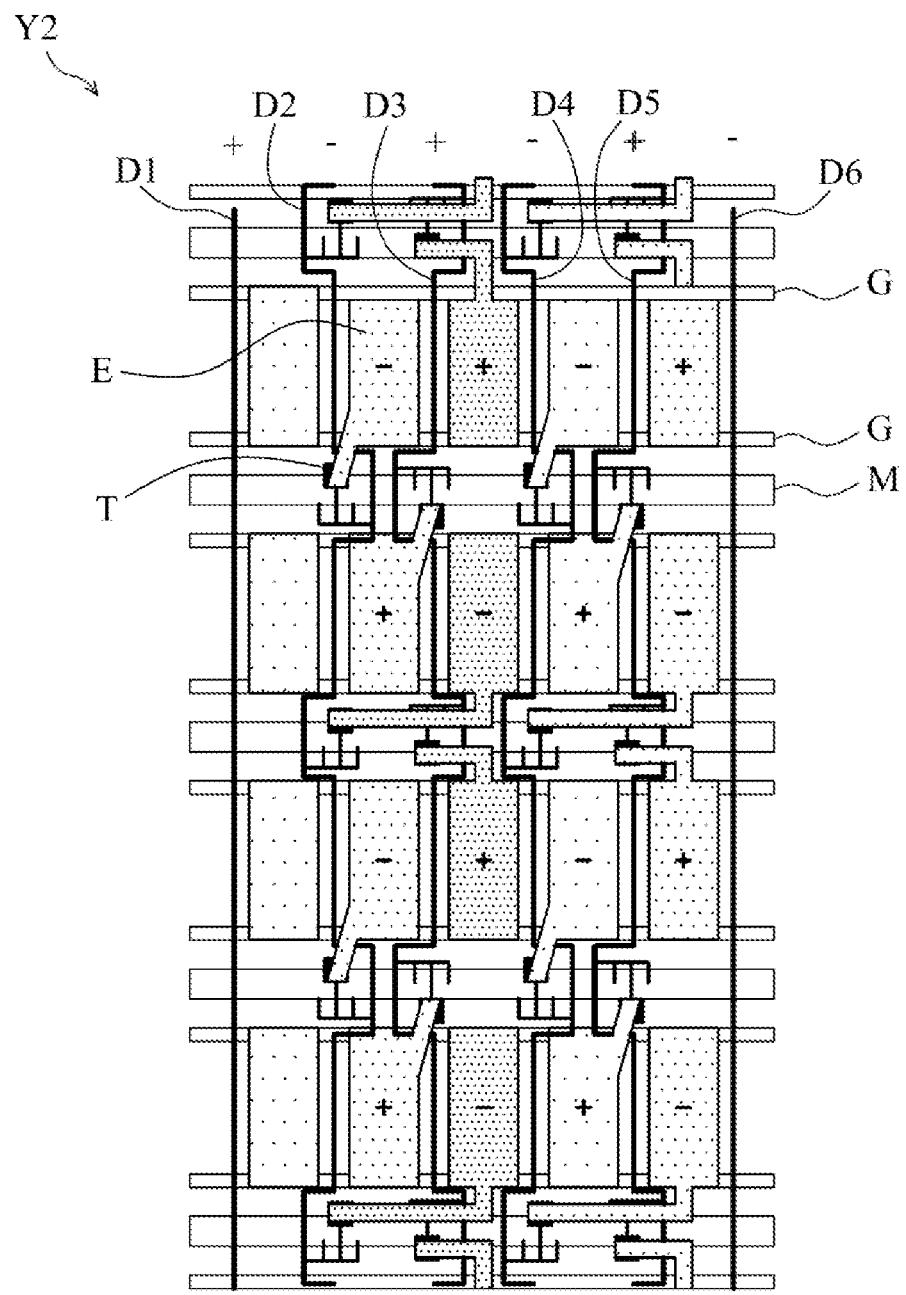

Illustratively, as shown in FIG. 4 and FIG. 5, a first wiring configuration Y1 and a second wiring configuration Y2 of the embodiment of the above-mentioned array substrate of the present invention are shown. The transistors T of the pixel electrodes E of different sub-pixels are electrically connected to different data lines D1-D6. This allows the pixel electrodes E to be configured to have different voltage polarities. Below the transistor T is a horizontal scan line G, and there is a horizontal common wire M near the horizontal scan line G, which is used to implement the many embodiments of the present invention as described above.

The following describes the process of the embodiments of the array substrate of the present invention for displaying different images, but it is not limited to this.

Figure 6A:
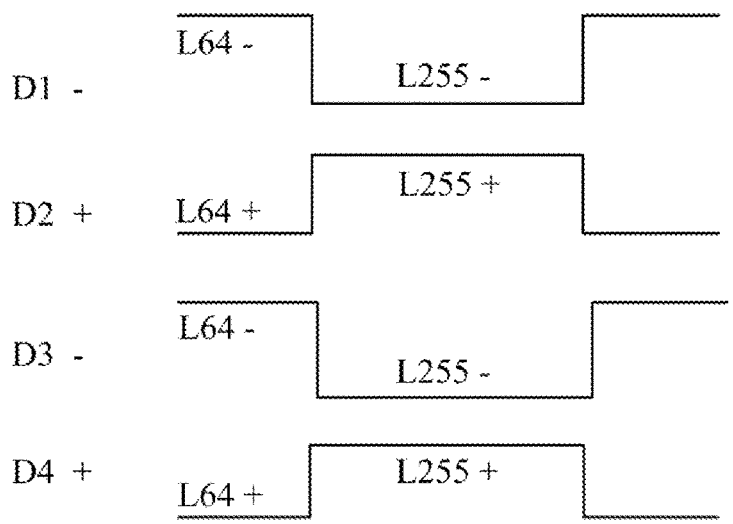
FIG. 6A is a schematic diagram of a data line waveform for displaying a monochrome frame according to an embodiment of the present invention.
Figure 6B:
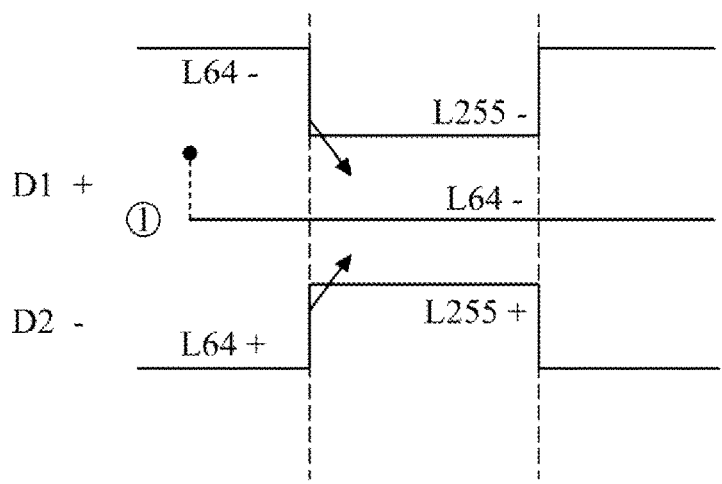
FIG. 6B and FIG. 6C are schematic diagrams of pixel voltages for sub-pixels in different rows of a monochrome frame affected by a data line coupling effect according to an embodiment of the present invention.
Figure 6C:
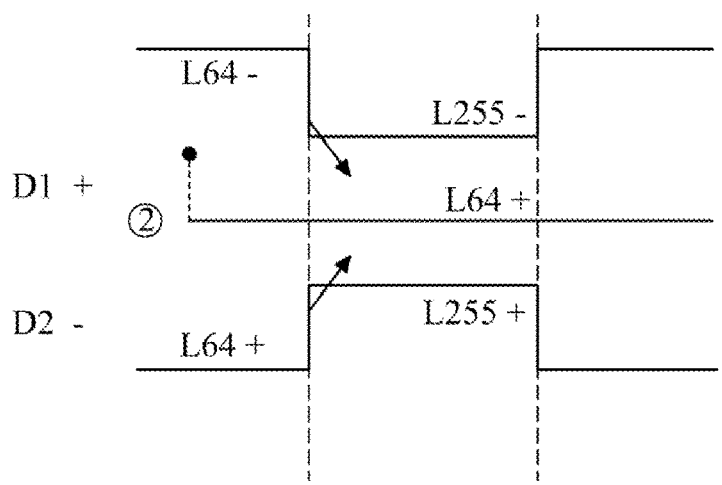

For example, the operation application of the above-mentioned embodiment of the array substrate of the present invention is shown in FIG. 2A. it is assumed that there are data lines D1-D4 (for example, configured for red, green, blue, and red from left to right) along the vertical scanning direction d, passing through the middle frame A2 (for example, white, the gray level is L255, which is regarded as the observation area). If the red (r), green (g), and blue (b) columns are connected to the data lines D1-D4, a connection structure is used to realize a dot inversion mode (as shown in FIG. 3). Taking the observation area as an example, as shown in FIG. 6A, it is assumed that the waveforms of the data lines D1 (−) and D3 (−) are between "L64−" and "L255−". The waveforms of the data lines D2(+) and D4(+) are between "L64+" and "L255+". When used to display a picture where vertical crosstalk occurs in the prior art, as shown in FIG. 6B and FIG. 6C, because voltage polarities of the data lines on both sides of the sub-pixel are opposite, the waveforms are symmetrical. Taking the red (r) sub-pixel as an example, after the data lines on both sides of the red sub-pixel are coupled, the red sub-pixels are offset by the coupling effect of the data lines on both sides, and vertical crosstalk will not occur.

Figure 6D:
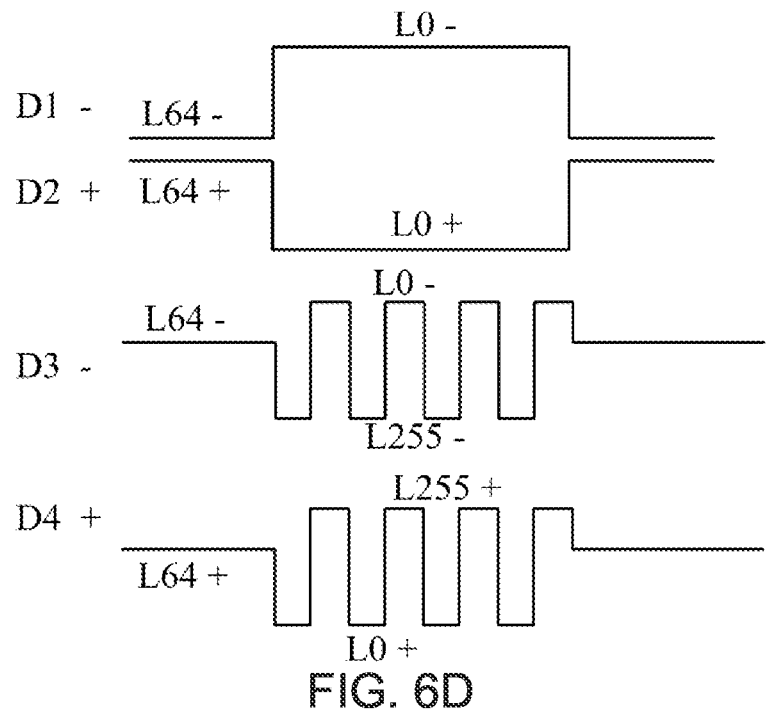
FIG. 6D is a schematic diagram of a data line waveform used to display a color frame according to an embodiment of the present invention.
Figure 6E:
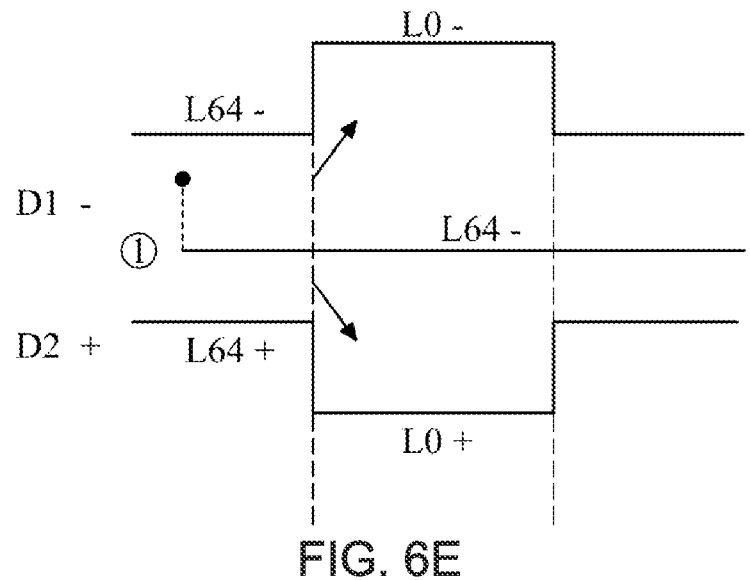
FIG. 6E and FIG. 6F are schematic diagrams of pixel voltages for sub-pixels in different rows of a color frame affected by a data line coupling effect according to an embodiment of the present invention.
Figure 6F:
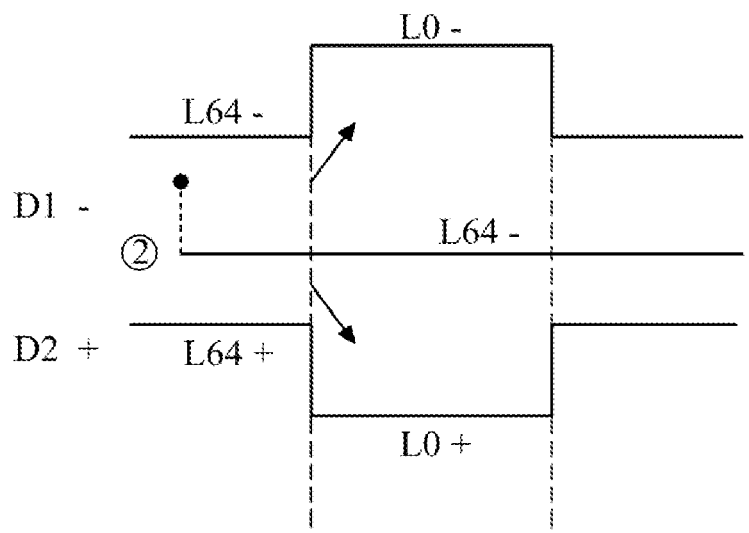

On the other hand, as shown in FIG. 2A, suppose there are data lines D1-D4 along the vertical scanning direction d (for example, arranged for red, green, blue, and red from left to right) passing through the middle frame A2 (for example, blue, as the observation area), upper frame A3 (e.g., dark blue) and lower frame (e.g., dark green). It is assumed that a connection structure between the sub-pixels in the red (r), green (g), and blue (b) columns and the data lines D1-D4 used to implement a dot inversion mode remains unchanged (as shown in FIG. 3). Taking the observation area as an example, as shown in FIG. 6D, it is assumed that the waveform of the data line D1(−) is between "L64−" and "L0−". The waveform of the data line D2(+) is between "L64+" and "L0+". The waveform of the data line D3(−) is between "L64−", "L0−" and "L255−". The waveform of the data line D4(+) is between "L64+", "L0+" and "L255+". When displaying a picture with color crosstalk in the prior art, as shown in FIG. 6E and FIG. 6F, because the voltage polarities of the data lines on both sides of the sub-pixels are opposite, the waveforms are symmetrical. Taking the red (r) sub-pixels in rows 1 and 2 as an example, after the data lines on both sides of the red sub-pixel are coupled, the red sub-pixels are offset by the coupling effect of the data lines on both sides, and color crosstalk does not occur.

Another aspect of the present invention provides a display panel including the above-mentioned array substrate. For example, liquid crystal materials and related accessories can be arranged between the array substrate and the color filter substrate. The display panel can be configured as a liquid crystal display panel or its derivatives, such as a touch panel, but not limited to this.

Therefore, in the above-mentioned embodiments of the array substrate and the display panel of the present invention, in two adjacent rows of sub-pixels, the odd-numbered column or the even-numbered column is set as the target column. The two sub-pixels of the target column are electrically connected to two adjacent data lines on both sides of the target column. Two sub-pixels in a column adjacent to the target column are electrically connected to two adjacent data lines on both sides of the target column. This can balance the coupling capacitance effect from both sides of the sub-pixels in the target column, and improve the crosstalk caused by the imbalance of the coupling voltage. This can improve the vertical crosstalk or color crosstalk in the prior art.

Figure 7:
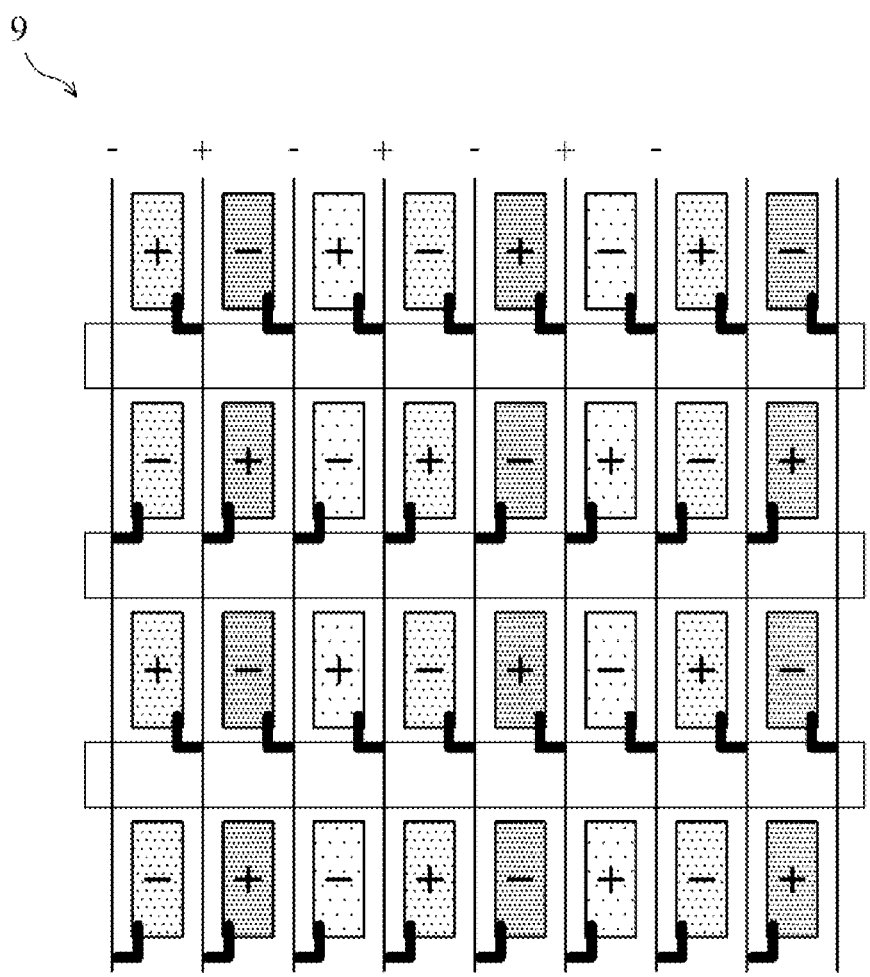
FIG. 7 is a schematic diagram of another array substrate used as a comparative example.

As an example, assume that a picture of the color crosstalk occurring in the prior art is used as the test basis. Compared with another comparative example (array substrate 9 in FIG. 7) that does not adopt the architecture of the above-mentioned embodiment (as shown in FIG. 3), as shown in Table 1 below. Take the red (r) and blue (b) sub-pixel coupling results of rows ① and ② as an example. The above-mentioned embodiments of the array substrate and the display panel of the present invention can reduce the risk of color crosstalk by half. For example, there is no risk of color crosstalk in some red, blue, and green sub-pixels.

TABLE 1

Crosstalk risk analysis table

|  |  | Comparative example | | | | | | Embodiment of the invention | | | | | |
| --- | --- | --- | --- | --- | --- | --- | --- | --- | --- | --- | --- | --- | --- |
|  |  | R | G | B | R | G | B | R | G | B | R | G | B |
| Coupling result | blue① | light | dark | — | light | dark | — | — | dark | — | — | — | light |
|  | blue② | dark | light | — | dark | light | — | — | light | — | — | — | dark |
|  | red① | — | light | dark | — | light | dark | — | — | light | — | dark | — |
|  | red② | — | dark | light | — | dark | light | — | — | dark | — | light | — |
| Risk |  | High risk of color crosstalk | | | | | | Color crosstalk risk halved | | | | | |

A display panel and an array substrate thereof, which include a plurality of sub-pixel groups arranged in a matrix on the array substrate. Each sub-pixel group includes a plurality of sub-pixels arranged along rows and columns. Two adjacent sub-pixels in the same row have different colors, and two adjacent sub-pixels in the same column have the same color. In two adjacent rows of sub-pixels, an odd-numbered column or an even-numbered column is set as a target column. Two sub-pixels of the target column in the sub-pixel group are electrically connected to two adjacent data lines located on both sides of the target column. Two sub-pixels in an adjacent column of the target column are electrically connected to two adjacent data lines located on both sides of the target column. For example, by configuring two adjacent data lines to have different voltage polarities, two sub-pixels in an even-numbered column are electrically connected to two adjacent data lines on both sides of the odd-numbered column. This can balance a coupling capacitance effect from both sides of the sub-pixels in the odd-numbered column, and improve a crosstalk caused by an imbalance of a coupling voltage. Therefore, compared with other substrate layout techniques, the display panel and the array substrate of the present invention can achieve beneficial effects such as effectively reducing a risk of crosstalk in a display image, which is beneficial to optimize a use experience and improve a technical level.

The embodiments of the present invention are described in detail above, and specific examples are used in this article to illustrate the principle and implementation of the present invention. The description of the above embodiments is only used to help understand the technical solution and the core idea of the present invention. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present invention.

What is claimed is:

1. An array substrate, comprising:
a plurality of scan lines;
a plurality of data lines arranged cross with the plurality of scan lines, wherein two adjacent data lines are configured to have different voltage polarities; and
a plurality of sub-pixel groups arranged in a matrix on the array substrate, wherein each sub-pixel group comprises a plurality of sub-pixels arranged along rows and columns, two adjacent sub-pixels in the same row are configured to have different colors, and two adjacent sub-pixels in the same column are configured to have the same color; in two rows of sub-pixels, an odd-numbered column or an even-numbered column is set as a target column, two sub-pixels of the target column in the sub-pixel group are electrically connected to two adjacent data lines located on both sides of the target column, and two sub-pixels in a column adjacent to the target column are electrically connected to two adjacent data lines located on both sides of the target column;
wherein two adjacent sub-pixels along a row and a column are configured to have different voltage polarities; and in the sub-pixels in the same column of the sub-pixel group, two adjacent sub-pixels are electrically connected to two adjacent data lines on both sides of the target column from an end far away from the scan line or an end close to the scan line;
wherein two scan lines are provided between two adjacent rows of sub-pixels, and two adjacent sub-pixels in the same row are respectively configured with two scan lines on both sides of the two adjacent sub-pixels in the same row;
wherein continuous plurality of sub-pixels in the same row of the sub-pixel group comprise one sub-pixel in a middle of the same row and two sub-pixels on both sides of the same row, a conductive wire electrically connected to the one sub-pixel in the middle crosses one of the data lines, and the conductive wire crossing the one of the data lines and a conductive wire electrically connected to the two sub-pixels on the both sides are away from each other along a direction in which the data lines extend.

2. The array substrate according to claim 1, wherein in two adjacent sub-pixels in a column adjacent to the target column, one sub-pixel extends to form a conductive line that crosses one of two adjacent data lines on both sides of the target column and is electrically connected to the other data line, and the other sub-pixel is electrically connected to one data line that is crossed over.

3. The array substrate according to claim 2, wherein in two adjacent sub-pixels in a column adjacent to the target column, one sub-pixel extends from one end close to the scan line to form a right-angle turning wire, spans one of two adjacent data lines on both sides of the target column and is electrically connected to the other data line.

4. The array substrate according to claim 1, wherein two adjacent sub-pixels in the same column of the sub-pixel group extend from an end close to the scan line to form a right-angle turning wire to be electrically connected to the data line.

5. The array substrate according to claim 1, wherein two adjacent sub-pixels in the same column of the sub-pixel group extend from an end far away from the scan line to form a right-angle turning wire or an obtuse-angle turning wire to be electrically connected to the data line.

6. The array substrate according to claim 1, wherein in the sub-pixels in the same row of the sub-pixel group, two adjacent sub-pixels are respectively electrically connected to two adjacent data lines on both sides of the target column from an end far away from the scan line and an end close to the scan line.

7. The array substrate according to claim 6, wherein in two adjacent sub-pixels in the same row of the sub-pixel group, one sub-pixel extends to form a conductive line that crosses one of two adjacent data lines on both sides of the target column and is electrically connected to the other data line, and the other sub-pixel is electrically connected to one data line that is crossed over.

8. The array substrate according to claim 7, wherein in two adjacent sub-pixels in the same row of the sub-pixel group, one sub-pixel extends from one end close to the scan line to form a right-angle turning wire, spans one of two adjacent data lines on both sides of the target column and is electrically connected to the other data line.

9. An array substrate, comprising:
a plurality of scan lines;
a plurality of data lines arranged cross with the plurality of scan lines, wherein two adjacent data lines are configured to have different voltage polarities; and
a plurality of sub-pixel groups arranged in a matrix on the array substrate, wherein each sub-pixel group comprises a plurality of sub-pixels arranged along rows and columns, two adjacent sub-pixels in the same row are configured to have different colors, and two adjacent sub-pixels in the same column are configured to have the same color; in two rows of sub-pixels, an odd-numbered column or an even-numbered column is set as a target column, two sub-pixels of the target column in the sub-pixel group are electrically connected to two adjacent data lines located on both sides of the target column, and two sub-pixels in a column adjacent to the target column are electrically connected to two adjacent data lines located on both sides of the target column;
wherein two scan lines are provided between two adjacent rows of sub-pixels, and two adjacent sub-pixels in the same row are respectively configured with two scan lines on both sides of the two adjacent sub-pixels in the same row;
wherein continuous plurality of sub-pixels in the same row of the sub-pixel group comprise one sub-pixel in a middle of the same row and two sub-pixels on both sides of the same row, a conductive wire electrically connected to the one sub-pixel in the middle crosses one of the data lines, and the conductive wire crossing the one of the data lines and a conductive wire electrically connected to the two sub-pixels on the both sides are away from each other along a direction in which the data lines extend.

10. The array substrate according to claim 9, wherein in the sub-pixels in the same column of the sub-pixel group, two adjacent sub-pixels are electrically connected to two adjacent data lines on both sides of the target column from an end far away from the scan line or an end close to the scan line.

11. The array substrate according to claim 10, wherein in the two adjacent sub-pixels in a column adjacent to the target column, one sub-pixel extends to form a conductive line that crosses one of two adjacent data lines on both sides of the target column and is electrically connected to the other data line, and the other sub-pixel is electrically connected to one data line that is crossed over.

12. The array substrate according to claim 11, wherein in two adjacent sub-pixels in a column adjacent to the target column, one sub-pixel extends from one end close to the scan line to form a right-angle turning wire, spans one of two adjacent data lines on both sides of the target column and is electrically connected to the other data line.

13. The array substrate according to claim 10, wherein two adjacent sub-pixels in the same column of the sub-pixel group extend from an end close to the scan line to form a right-angle turning wire to be electrically connected to the data line.

14. The array substrate according to claim 10, wherein two adjacent sub-pixels in the same column of the sub-pixel group extend from an end far away from the scan line to form a right-angle turning wire or an obtuse-angle turning wire to be electrically connected to the data line.

15. The array substrate according to claim 9, wherein in the sub-pixels in the same row of the sub-pixel group, two adjacent sub-pixels are respectively electrically connected to two adjacent data lines on both sides of the target column from an end far away from the scan line and an end close to the scan line.

16. The array substrate according to claim 15, wherein in two adjacent sub-pixels in the same row of the sub-pixel group, one sub-pixel extends to form a conductive line that crosses one of two adjacent data lines on both sides of the target column and is electrically connected to the other data line, and the other sub-pixel is electrically connected to one data line that is crossed over.

17. The array substrate according to claim 16, wherein in two adjacent sub-pixels in the same row of the sub-pixel group, one sub-pixel extends from one end close to the scan line to form a right-angle turning wire, spans one of two adjacent data lines on both sides of the target column and is electrically connected to the other data line.

18. A display panel comprising an array substrate, wherein the array substrate comprises:
a plurality of scan lines;
a plurality of data lines arranged cross with the plurality of scan lines, wherein two adjacent data lines are configured to have different voltage polarities; and
a plurality of sub-pixel groups arranged in a matrix on the array substrate, wherein each sub-pixel group comprises a plurality of sub-pixels arranged along rows and columns, two adjacent sub-pixels in the same row are configured to have different colors, and two adjacent sub-pixels in the same column are configured to have the same color; in two rows of sub-pixels, an odd-numbered column or an even-numbered column is set as a target column, two sub-pixels of the target column in the sub-pixel group are electrically connected to two adjacent data lines located on both sides of the target column, and two sub-pixels in a column adjacent to the target column are electrically connected to two adjacent data lines located on both sides of the target column;
wherein two scan lines are provided between two adjacent rows of sub-pixels, and two adjacent sub-pixels in the same row are respectively configured with two scan lines on both sides of the two adjacent sub-pixels in the same row;
wherein continuous plurality of sub-pixels in the same row of the sub-pixel group comprise one sub-pixel in a middle of the same row and two sub-pixels on both sides of the same row, a conductive wire electrically connected to the one sub-pixel in the middle crosses one of the data lines, and the conductive wire crossing the one of the data lines and a conductive wire electrically connected to the two sub-pixels on the both sides are away from each other along a direction in which the data lines extend.

19. The display panel according to claim 18, wherein in the sub-pixels in the same column of the sub-pixel group, two adjacent sub-pixels are electrically connected to two adjacent data lines on both sides of the target column from an end far away from the scan line or an end close to the scan line.

20. The display panel according to claim 18, wherein in the sub-pixels in the same row of the sub-pixel group, two adjacent sub-pixels are respectively electrically connected to two adjacent data lines on both sides of the target column from an end far away from the scan line and an end close to the scan line.

* * * * *